(12) United States Patent
Schenk

(10) Patent No.: US 6,270,144 B1
(45) Date of Patent: Aug. 7, 2001

(54) DEVICE FOR OPENING AND CLOSING A TAILGATE

(75) Inventor: Bernhard Schenk, Böblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/523,672

(22) Filed: Mar. 10, 2000

(30) Foreign Application Priority Data

Mar. 11, 1999 (DE) ............................................. 199 10 763

(51) Int. Cl.[7] ....................................................... B60J 7/20
(52) U.S. Cl. ........................ 296/107.08; 296/76; 296/136
(58) Field of Search ............................... 296/51, 107.08, 296/76, 136; 49/192, 193, 280, 281, 279

(56) References Cited

U.S. PATENT DOCUMENTS

| | | | |
|---|---|---|---|
| 5,655,331 | * | 8/1997 | Schrader et al. ......................... 49/280 |
| 5,823,606 | * | 10/1998 | Schenk et al. ................... 296/107.08 |
| 6,092,335 | * | 7/2000 | Queveau et al. ........................ 49/192 |
| 6,164,713 | * | 12/2000 | Graf et al. ....................... 296/107.08 |
| 6,193,300 | * | 2/2001 | Nakatomi et al. ............... 296/107.08 |

FOREIGN PATENT DOCUMENTS 41 29 706 A1    3/1993  (DE) .
195 16 877
        C1  10/1996  (DE) .
0 304 357 B1    2/1989  (EP) .

* cited by examiner

Primary Examiner—D. Glenn Dayoan
Assistant Examiner—Jason Morrow
(74) Attorney, Agent, or Firm—Crowell & Moring, L.L.P.

(57) ABSTRACT

A device for opening and closing a pivotable tailgate which covers a folding-top compartment into which a pivotable roof structure for a cabriolet, hardtop vehicle can be deposited, is provided with an auxiliary frame on the tailgate in order to carry out the pivoting movement. At least one hydraulic cylinder is arranged on the auxiliary frame. The hydraulic cylinder is mounted by a slot and is provided with a sheathed cable which enables a locking wedge, which is arranged on the auxiliary frame, to be locked in a receiving part fixed on the body in a closed position of the tailgate. In this arrangement, the locking wedge can be released in a first movement phase of the hydraulic cylinder, which movement phase is provided for opening the tailgate. The hydraulic cylinder is provided with a locking and release element on which at least one actuating-cable part is arranged in such a manner that the locking wedge can be locked in the receiving part and released therefrom by the free movement of the hydraulic cylinder resulting from the slot.

23 Claims, 3 Drawing Sheets

DEVICE FOR OPENING AND CLOSING A TAILGATE

BACKGROUND AND SUMMARY OF THE INVENTION

This application claims the priority of German Patent Document 199 10 763.7, filed Mar. 11, 1999, the disclosure of which is expressly incorporated by reference herein.

The invention relates to a device for opening and closing a tailgate, in particular a pivotable tailgate, which covers a folding-top compartment. Preferred embodiments of the invention relate to a device for opening and closing a pivotable tailgate which covers a folding-top compartment into which a pivotable roof structure for a convertible hardtop vehicle can be deposited, an auxiliary frame being provided on the tailgate in order to carry out the pivoting movement, on which auxiliary frame at least one hydraulic cylinder driving element is arranged, the hydraulic cylinder being provided with a sheathed cable which enables a locking wedge, which is arranged on the auxiliary frame and in a closed position of the tailgate is locked in a receiving part fixed on the body, to be released in a first movement phase of the hydraulic cylinder, which movement phase is provided for opening the tailgate.

A device of the generic type is disclosed, for example, in German Patent Document DE 195 16 877 C1 .

The device disclosed in the abovementioned publication relates to hardtop vehicles having a two-part roof structure which can be deposited in a folding-top compartment below a tailgate in the rear region of the vehicle. In this arrangement, the folding-top compartment is closed by way of a tailgate both in the open driving state of the vehicle and in the closed driving state of the vehicle. The tailgate is supported pivotably via an auxiliary frame in the region of respective pivot bearings which are fixed on the body and are provided in each case on both sides of the longitudinal axis of the vehicle. In the closed position of the tailgate, the auxiliary frame is arranged on the vehicle body, for example in the region of the wheelhouse, via a supporting connection. The supporting connection has a receiving part which is fastened on the body and in which the auxiliary frame can be supported in a crash-stable manner. In this case, a peg part, which is connected to the auxiliary frame and has a locking wedge, engages in the receiving part with a force fit and/or in an interlocking manner.

A disadvantage of this arrangement is that the locking wedge is introduced into the receiving part by means of the hydraulic cylinder, which is provided for opening and for closing the tailgate. An angular position of the hydraulic cylinder which deviates from the direction in which the locking wedge is locked into the receiving part causes the auxiliary frame to become distorted. This leads to problems when adjusting the auxiliary frame or the tailgate. Moreover, an increase in the power required at the hydraulic cylinder is necessary.

For the general prior art, reference is furthermore made to European Patent Document EP 0 304 357 B1 and German Patent Document DE 41 29 706 A1.

The present invention is therefore based on the object of providing a device for opening and closing a tailgate, which device makes it possible for the tailgate to be locked and released reliably, and prevents distortion of the auxiliary frame and an increase in the power required at the hydraulic cylinder.

According to the invention, this object is achieved by a device of the above noted type, wherein the hydraulic cylinder is mounted at a vehicle body part by means of a slot, and wherein the hydraulic cylinder is provided with a locking and release element on which at least one actuating-cable part is arranged in such a manner that the locking wedge can be locked in the receiving part and released therefrom by the free movement of the hydraulic cylinder resulting from the slot.

The locking and release element, which is arranged on the hydraulic cylinder, enables the free movement resulting from the slot of the hydraulic cylinder to be used for locking the locking wedge in the receiving part and releasing it therefrom, by means of an appropriate arrangement of the at least one actuating-cable part. An increase in the power expended by the hydraulic cylinder is therefore no longer necessary, since the actuating-cable part carrying out the locking and release of the locking wedge can be arranged in such a manner that unlike previously, the flow of power does not act obliquely, but in the intended direction. The auxiliary frame is thereby prevented in an advantageous manner from becoming distorted.

The hydraulic cylinder, which is provided with the locking and release element, and the at least one actuating-cable part make it possible for both the hydraulic cylinder and the auxiliary frame to be of correspondingly smaller dimensions, and therefore to be designed more cost-effectively and easily.

Other objects, advantages and novel features of the present invention will become apparent from the following detailed description of the invention when considered in conjunction with the accompanying drawings.

DETAILED DESCRIPTION OF THE DRAWINGS

Figure 1:
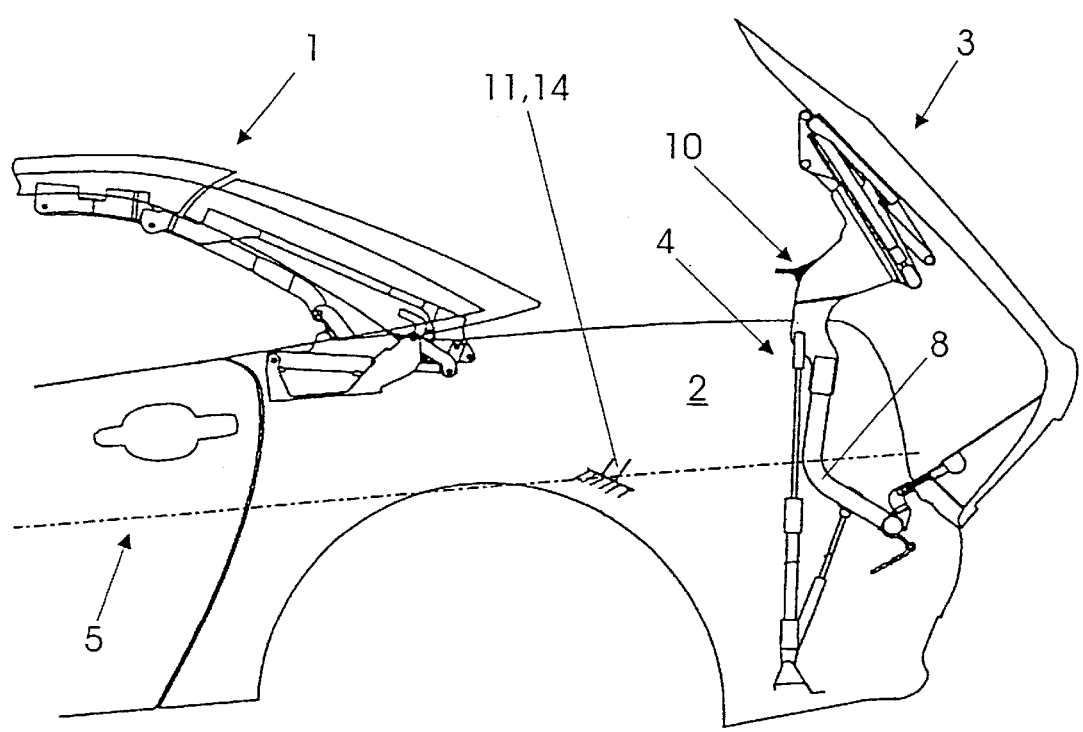
FIG. 1 shows a partially cut away side view of a hardtop vehicle in the rear region, with a tailgate which is open in order to pivot the roof structure in or out, constructed according to a preferred embodiment of the invention.

FIG. 1 shows a hardtop vehicle having a roof structure which is designated overall as 1 and which can be pivoted from a closed position, under the action of sufficiently known constrained control elements which are supported on the body, into an open position and can be deposited in a folding-top compartment 2. The folding-top compartment 2 is closed by means of a tailgate 3 both in the open driving state and in the closed driving state.

In this case, the tailgate 3 is supported via an auxiliary frame 4, which is secured by means of known pivot bearings which are fixed on the body and are arranged on both sides of a longitudinal axis 5 of the vehicle.

Figure 2:
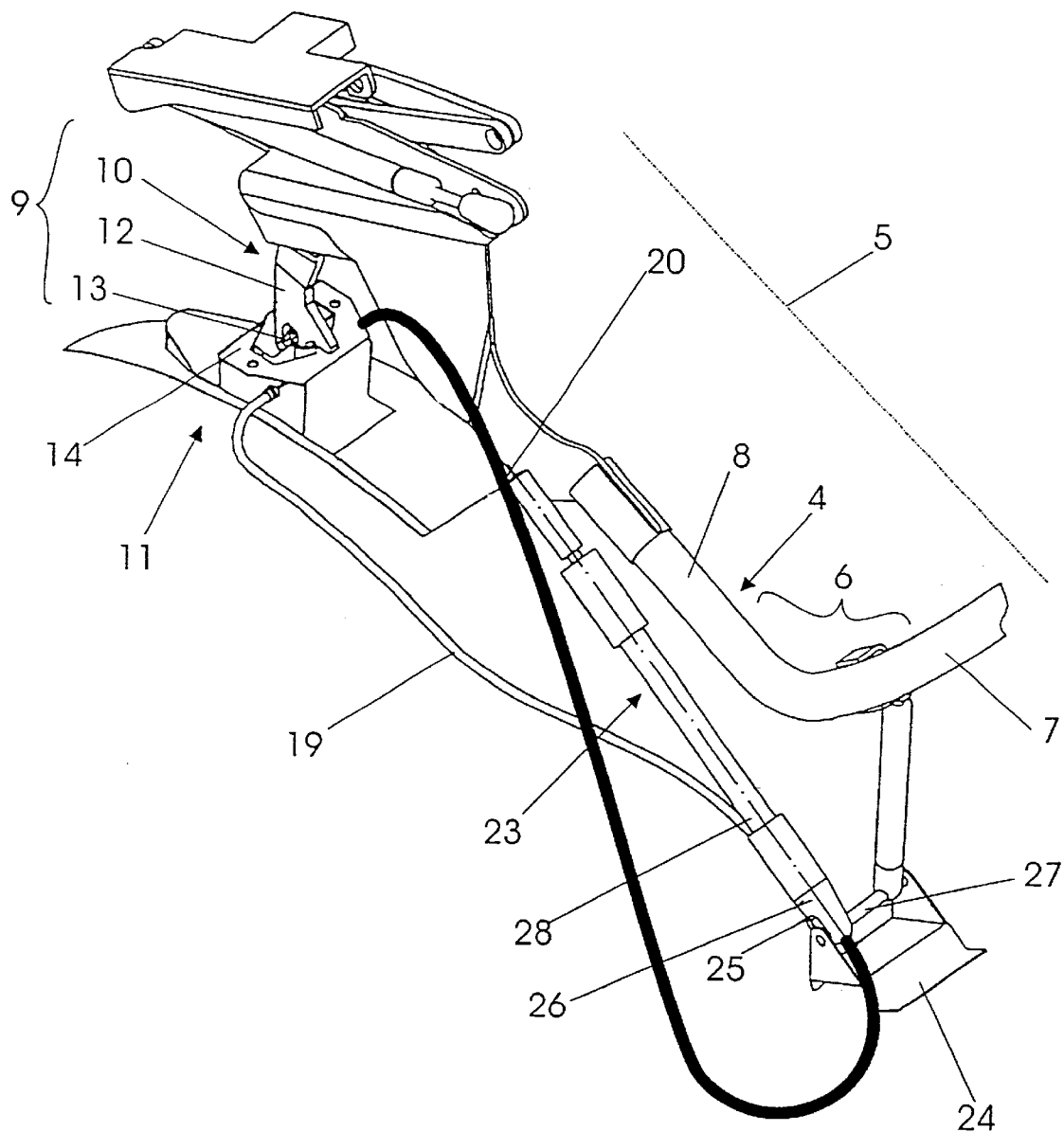
FIG. 2 shows an enlarged partial illustration of the auxiliary frame of FIG. 1 which supports the tailgate and has a supporting connection on the body.

As can be seen in FIG. 2, the auxiliary frame 4 is designed as a supporting tube 6 which is curved in the shape of a U and whose base limb 7 is arranged perpendicularly with respect to the longitudinal axis 5 of the vehicle and on whose free legs 8 a respective supporting connection 9 is provided.

In a closed position of the tailgate 3, the auxiliary frame 4 is supported in a receiving part 11 of the supporting connection 9 via a peg part 10, which is fastened on the said auxiliary frame. The peg part 10 has a locking wedge 12 which engages with a connecting profile 13 into the receiving part 11, which is designed as a lock 14, in the closed position illustrated in FIG. 2.

Figure 3:
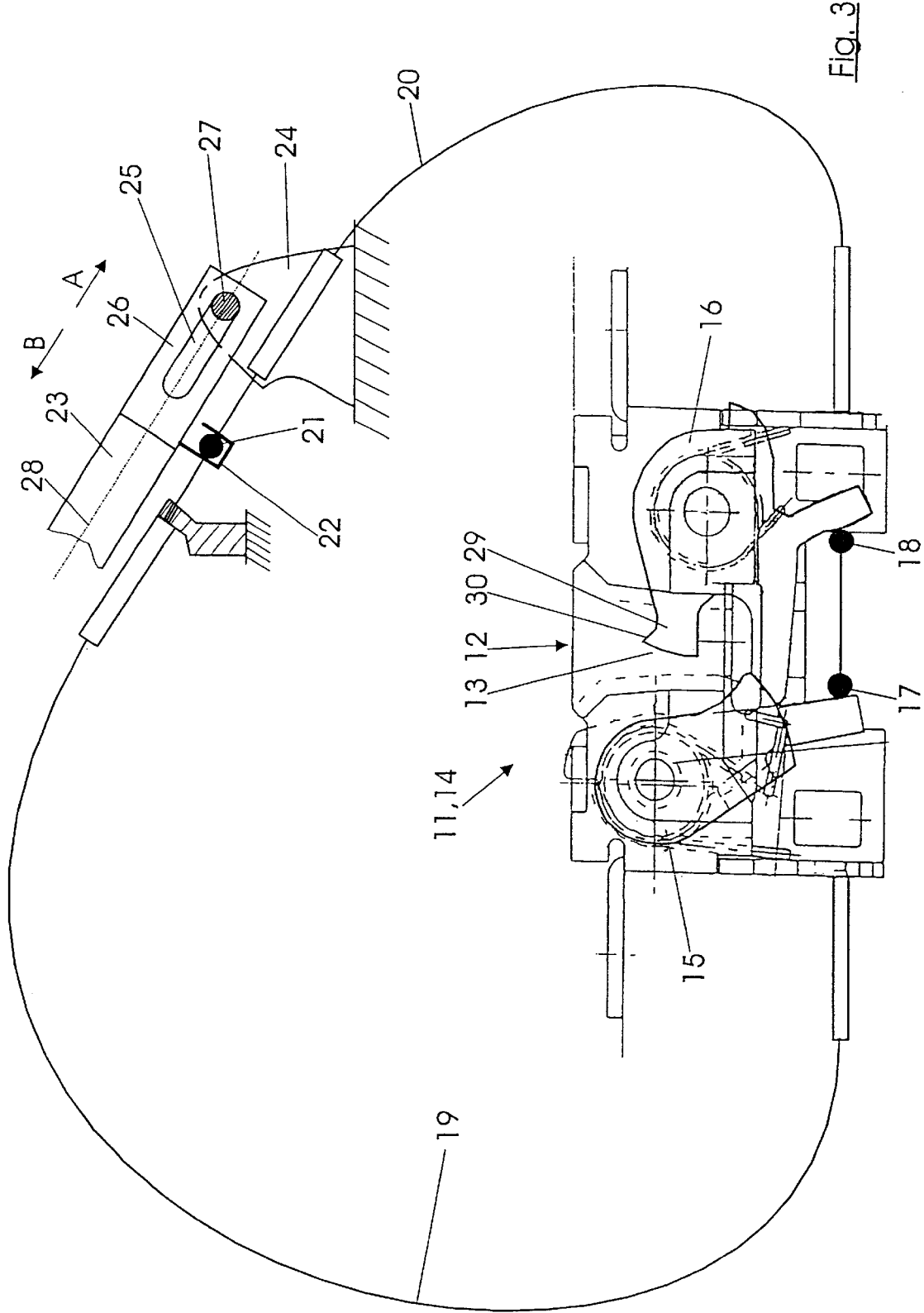
FIG. 3 shows a partially cut away detailed illustration of the receiving part of the supporting connection together with a schematic illustration of a hydraulic cylinder having a locking and release element and an actuating-cable part.

As can be seen in FIG. 3, the lock 14 has a detent pawl 15 and a rotary latch 16 on which a respective nipple 17 or 18 engages, the nipples in each case being connected fixedly to an actuating-cable part, one part being designed as a release actuating-cable part 19 and one as a locking actuating-cable part 20. In this case, the actuating-cable parts 19, 20 are designed as Bowden cables. The actuating-cable parts 19, 20 may, of course, also be designed as sheathed cables or as a rod-operated linkage.

Those ends of the actuating-cable parts 19, 20 which face away from the nipples 17, 18 are connected to a further nipple 21, on which a locking and release element, which is designed as a driving tongue 22, engages. The driving tongue 22 is rigidly connected to a driving element, which is designed as a hydraulic cylinder 23.

The hydraulic cylinder 23 is connected at one end to the limb 8 of the auxiliary frame 4 and is supported at the other end on the vehicle body in the region of a bearing block 24. Respective hydraulic cylinders 23 are advantageously provided on both limbs 8 in order to move the tailgate 3.

In the region of the respective bearing block 24, the hydraulic cylinder 23 is supported, via a supporting element 26 having a slot 25, fixed on the body in the region of a strut 27, so that a movement in the direction of a longitudinal axis 28 of the cylinder is possible.

Owing to the hydraulic cylinder 23, the driving tongue 22, which is arranged on the hydraulic cylinder 23, and the release actuating-cable part 19 and the locking actuating-cable part 20 being supported in this manner, the lock 14 can be released or locked with little effort.

In this case, the pulling movement of the release actuating-cable part 19 or of the locking actuating-cable part 20 takes place by means of the free movement of the hydraulic cylinder 23 resulting from the slot 25.

During the opening procedure of the tailgate 3, the center of rotation of the hydraulic cylinder 23 is displaced into the upper region of the slot 25 in a first movement phase. The connection of the driving tongue 22 to the hydraulic cylinder 23 simultaneously causes the driving tongue 22 to be displaced in the arrow direction A. Engagement of the driving tongue 22 on the nipple 21 causes the release actuating-cable part 19 likewise to be moved in the same direction. This has the consequence that the nipple 17, which is connected fixedly to the release actuating-cable part 19 and which bears against the detent pawl 15, is moved in a direction facing away from the rotary latch 16. The movement of the nipple 17 causes the detent pawl 15 of the lock 14 to be lifted up, so that the rotary latch 16 is unblocked. At the same time as the movement of the release actuating-cable part 19, the locking actuating-cable part 20, which has been gripping the rotary latch 16 via the nipple 18, releases its grip. Therefore, the first movement phase of the opening procedure of the tailgate 3 simultaneously causes the detent pawl 15 to be lifted up by the nipple 17 and the blocking of the rotary latch 16 by the nipple 18 to be cancelled. The rotary latch 16 therefore opens and, as a result, the locking wedge 12 is unblocked.

During the closing procedure of the tailgate 3, the center of rotation of the hydraulic cylinder 23 is displaced into the lower region of the slot 25 in a last movement phase. As a result, analogously to the opening procedure, the driving tongue 22 moves in an opposite direction to the opening procedure, which is illustrated by the arrow B. The driving tongue 22 again causes the nipple 21 to move. The nipple 21 now transmits a pulling movement to the locking actuating-cable part 20, which is connected to it. This pulling movement of the locking actuating-cable part 20 causes the nipple 18, which is arranged on the locking actuating-cable part 20 and which bears against the rotary latch 16, to move in a direction facing away from the detent pawl 15, in such a manner that the rotary latch 16 is pulled shut. At the same time, the detent pawl 15 is unblocked by the nipple 17, so that the rotary latch 16, after being completely pulled shut, can be locked by the detent pawl 15.

The rotary latch 16 is advantageously designed in such a manner that the locking wedge 12 is pulled into the lock 14 by the rotary latch 16 being pulled shut. For this purpose, the rotary latch 16 has a peg 29 which engages in a recess 30 in the locking wedge 12 in order to introduce the locking wedge 12 into the receiving part 11 or the lock 14. This advantageously enables the locking wedge 12 to be introduced into the lock 14 securely and with effort being saved. A pulling movement of the hydraulic cylinder 23, which is arranged in an angular position deviating from the receiving part 11 or lock 14, in order to pull the locking wedge 12 into the lock 14, is therefore unnecessary.

In an alternative refinement, instead of a separate release actuating-cable part 19 and a locking actuating-cable part 20 it is also possible for just one circumferential actuating-cable part 19, 20 connected together by the nipple 21 to be provided for carrying out both the locking and the release of the locking wedge 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for opening and closing a pivotable tailgate which covers a folding-top compartment into which a pivotable roof structure for a convertible hardtop vehicle can be deposited, an auxiliary frame being provided on the tailgate in order to carry out the pivoting movement, on which auxiliary frame at least one hydraulic cylinder driving element is arranged, the hydraulic cylinder being provided with a sheathed cable which enables a locking wedge, which is arranged on the auxiliary frame and in a closed position of the tailgate is locked in a receiving part fixed on the body, to be released in a first movement phase of the hydraulic cylinder, which movement phase is provided for opening the tailgate, wherein the hydraulic cylinder is mounted at a vehicle body part by means of a slot, and wherein the hydraulic cylinder is provided with a locking and release element on which at least one actuating-cable part is arranged in such a manner that the locking wedge can be locked in the receiving part and released therefrom by the free movement of the hydraulic cylinder resulting from the slot.

2. Device according to claim 1, wherein the locking and release element is designed as a driving tongue which is connected to the hydraulic cylinder and engages on a nipple, which is connected to the at least one actuating-cable part.

3. Device according to claim 1,
wherein the at least one actuating-cable part is designed as a Bowden cable.

4. Device according to claim 2,
wherein the at least one actuating-cable part is designed as a Bowden cable.

5. Device according to claim 1,
wherein one end of the actuating-cable part which faces the receiving part is designed as a release actuating-cable part which engages on a detent pawl of the receiving part in such a manner that a pulling movement of the release actuating-cable part causes the detent pawl to release the locking wedge.

6. Device according to claim 1,
wherein one end of the actuating-cable part which faces the receiving part is designed as a locking actuating-cable part which engages on a rotary latch of the receiving part in such a manner that a pulling movement of the locking actuating-cable part causes the rotary latch to lock the locking wedge.

7. Device according to claim 5,
wherein one end of the actuating-cable part which faces the receiving part is designed as a locking actuating-cable part which engages on a rotary latch of the receiving part in such a manner that a pulling movement of the locking actuating-cable part causes the rotary latch to lock the locking wedge.

8. Device according to claim 5,
wherein the release actuating-cable part is arranged on the driving tongue of the hydraulic cylinder in such a manner that, in a first movement phase of the opening procedure of the tailgate, the locking wedge can be released by means of the detent pawl.

9. Device according to claim 7,
wherein the release actuating-cable part is arranged on the driving tongue of the hydraulic cylinder in such a manner that, in a first movement phase of the opening procedure of the tailgate, the locking wedge can be released by means of the detent pawl.

10. Device according to claim 6,
wherein the locking actuating-cable part is arranged on the driving tongue of the hydraulic cylinder in such a manner that in a last movement phase of the closing procedure of the tailgate, the locking wedge can be locked by means of the rotary latch.

11. Device according to claim 7,
wherein the locking actuating-cable part is arranged on the driving tongue of the hydraulic cylinder in such a manner that in a last movement phase of the closing procedure of the tailgate, the locking wedge can be locked by means of the rotary latch.

12. Device according to claim 6,
wherein the rotary latch is designed in such a manner that the locking wedge can be introduced into the receiving part by means of the rotary latch.

13. Device according to claim 8,
wherein the rotary latch is designed in such a manner that the locking wedge can be introduced into the receiving part by means of the rotary latch.

14. Device according to claim 10,
wherein the rotary latch is designed in such a manner that the locking wedge can be introduced into the receiving part by means of the rotary latch.

15. Device according to claim 12,
wherein the rotary latch has a peg which engages in a recess in the locking wedge in order to introduce the locking wedge into the receiving part.

16. Device according to claim 2,
wherein two actuating-cable parts are arranged on the driving tongue, one actuating-cable part being designed as a release actuating-cable part and one cable part being designed as a locking actuating-cable part.

17. Device according to claim 4,
wherein two actuating-cable parts are arranged on the driving tongue, one actuating-cable part being designed as a release actuating-cable part and one cable part being designed as a locking actuating-cable part.

18. Device according tot claim 7,
wherein two actuating-cable parts are arranged on the driving tongue, one actuating-cable part being designed as a release actuating-cable part and one cable part being designed as a locking actuating-cable part.

19. Device according to claim 1,
wherein the hydraulic cylinder is supported via a supporting element having said slot, fixed on the body in the region of a strut in such a manner that a movement in the direction of a cylinder axis is possible.

20. Device according to claim 19,
wherein during the opening procedure of the tailgate, the center of rotation of the hydraulic cylinder is situated in the upper region of the slot, and during the closing procedure said center of rotation is situated in the lower region of the slot.

21. Device according to claim 4,
wherein the hydraulic cylinder is supported via a supporting element having said slot, fixed on the body in the region of a strut in such a manner that a movement in the direction of a cylinder axis is possible.

22. Device according to claim 21,
wherein during the opening procedure of the tailgate, the center of rotation of the hydraulic cylinder is situated in the upper region of the slot, and during the closing procedure said center of rotation is situated in the lower region of the slot.

23. A foldable hardtop assembly for a convertible hardtop vehicle, comprising:
a hard top storage compartment,
a tailgate cover operable to close the storage compartment,
a latching mechanism operable to latch the tailgate cover in a closed position,
a hydraulic cylinder mechanism operable to move the tailgate cover between open and closed positions, and
a latch actuating-cable carried by the cylinder mechanism and operable to lock and release the latching mechanism during movement of the hydraulic cylinder mechanism,
wherein the hydraulic cylinder mechanism is connected to the vehicle by a slotted connection which facilitates movement of the latch actuating-cable prior to movement of the cover during cover closing and opening movement of the hydraulic cylinder mechanism.

* * * * *